Aug. 2, 1938.　　　K. S. BROOKS ET AL　　　2,125,840
APPARATUS FOR TESTING BATTERIES
Filed Nov. 25, 1936

INVENTORS
Kenneth S. Brooks, and
Lester G. Henel.
BY
ATTORNEY

Patented Aug. 2, 1938

2,125,840

UNITED STATES PATENT OFFICE 2,125,840

APPARATUS FOR TESTING BATTERIES

Kenneth S. Brooks and Lester G. Henel, Kansas City, Mo., assignors of one-third to Alex B. Flemington, Kansas City, Mo.

Application November 25, 1936, Serial No. 112,730

8 Claims. (Cl. 175—183)

This invention relates to apparatus for testing batteries and particularly for aiding in the selection of a storage battery that is best suited for the service to which it is to be adapted. For example, battery manufacturers produce storage batteries in many grades, sizes and capacities in order that a type of battery is available for any particular service. The different types of batteries vary in cost depending upon the amount of electrolyte, the size, number and construction of the plates and the quality of the materials used in their construction. While each individual type of battery may be constructed in accordance with best practices and will be satisfactory in the service for which it was manufactured, it cannot give satisfactory service under other conditions of use particularly those requiring greater current demands.

A customer is ordinarily influenced by price and will purchase a battery which is not adequate to supply the current demanded, with the result that he is not obtaining care-free service that a battery would give having ample capacity. This is particularly true in the automotive field wherein a battery is called upon to supply current for not only the lights, horn, starting motor and other standard equipment but also to a radio, heater and other accessories that have been added by the owner. The battery furnished by the motor manufacturer is of an ampere hour capacity for supplying the lights, horn, starting motor and usual equipment but is not sufficient to supply a radio, heater and other subsequently added accessories. The battery, therefore, gives very poor service and is of very short life. As above pointed out, the cost of battery replacement is an influencing factor with the result that the replacement battery is little better than the first.

It is, therefore, a principal object of the present invention to provide apparatus for comparing batteries, whereby the battery merchant may visualize to the prospective purchaser the actual service which he may expect from any given battery when that battery is used to supply all of the accessories connected in the electrical system of his motor car. The customer is thus caused to realize the added service and advantage which an adequate, but more expensive battery will give for his particular use, with the result that he buys a battery according to the service that he might expect from it, rather than being influenced by the original cost.

It is also an important object of the invention to provide means for indicating if the ampere hour capacity of a battery is within its specified rating.

It is a further object of the invention to determine the ampere hour capacity of a battery when the rating is unknown.

In accomplishing these and other objects of the invention, as hereinafter pointed out, we have provided improved details of structure, the preferred forms of which are illustrated in the accompanying drawing, wherein.

Figure 1:
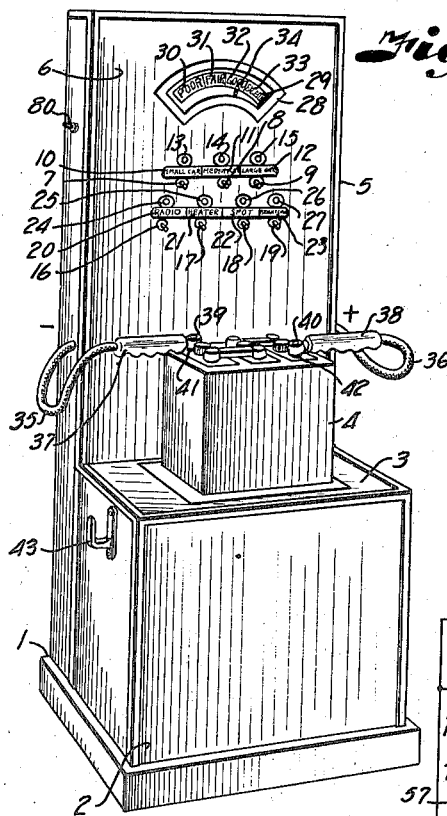
Fig. 1 is a perspective view of a battery testing apparatus embodying the features of the present invention.

Referring more in detail to the drawing:

In carrying out the present invention we have found that the ratio of the internal resistance in a battery to its ampere hour capacity is substantially the same for all sizes and types of storage batteries. We therefore provide means for indicating the internal resistance to a current flowing through the battery, and by inserting resistances or impedances in the circuit related in value to the resistances of various electrical accessories, we are enabled to convey to prospective customers the amount of service that may be expected from a battery, as now to be described.

I designates a casing including a base section 2 provided with a horizontal top 3 for supporting a battery 4 to be tested. Extending upwardly from the base section 2 and to the rear of the top 3 is a vertical section 5 forming an instrument panel 6 for mounting a row of switches 7, 8 and 9 labeled to designate small, medium and large cars, as indicated at 10, 11 and 12 respectively. Located above the switches are signal lights 13, 14 and 15 which are respectively energized when a corresponding switch is placed in circuit as later described.

Carried on the panel below the switches just described is a second set of switches 16, 17, 18 and 19 labeled to designate various types of equipment that are apt to be connected in a battery circuit such as "Radio", "Heater", "Spot light" and "Bright lights" respectively designated 20, 21, 22 and 23. Also located on the panel at points in line with the respective switches, are signal lights 24, 25, 26 and 27 that are likewise energized when any one of the switches 16, 17, 18 and 19 are close. Also carried on the panel is an indicating device 28 having a dial 29 arranged in a suitable opening in the panel which in the illustrated instance is marked with the designations "Poor", "Fair", "Good", "Excellent", as indicated at 30, 31, 32 and 33 respectively. Movable over the dial is an indicating hand 34 operable incidental to closure of one or more of the respective switches as later described.

Connected in circuit with the switches, signal lights and indicator are flexible conductors 35 and 36 having insulating handles 37 and 38 carrying battery terminal engaging heads 39 and 40 for attachment to the positive and negative terminals 41 and 42 of the battery respectively. The sides of the base 2 are provided with hooks 43 over which the battery terminal connectors may be engaged when not in use.

Located within the casing are electrical circuits for operably connecting the various switches, signal lights and indicating meter in circuit with the battery to pass a fluctuating or pulsating current therethrough to measure the voltage drop occurring in the circuit in the terms of service expected from the battery when any of the switches are closed representing the type of the car and the various electrical appurtenances that are to be supplied by the battery.

Figure 2:
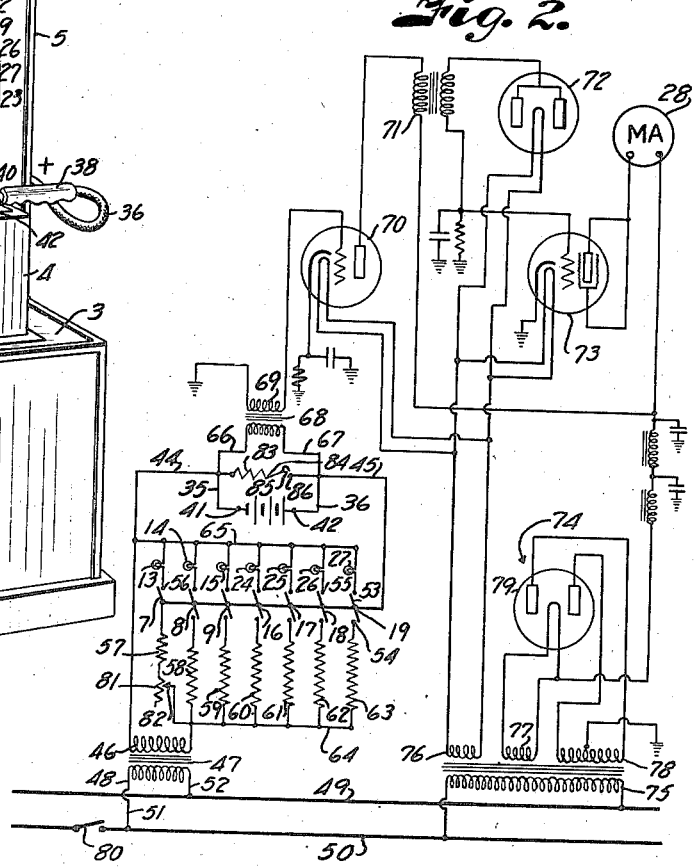
Fig. 2 is a diagrammatic view of the electrical system employed in the apparatus.

The preferred form of circuit connections for the respective instruments is illustrated in Fig. 2 wherein it will be noted that the terminals 41 and 42 are connected through the flexible conductors 35 and 36 with conductors 44 and 45. The conductor 44 is connected with one terminal of the secondary winding 46 of a transformer 47 having its primary winding 48 connected with service lines 49 and 50 by leads 51 and 52. The conductor 45 connects the movable contact elements 53 of all the switches 7, 8, 9 and 16, 17, 18, and 19 in series with each other. The switches 8, 9 and 16, 17, 18 and 19 have pairs of contacts 54 and 55 adapted to be engaged by the movable elements of the switches when the switches are closed as later described. The switch 7, however, has a single contact 56 corresponding to the contacts 55. The contacts 54 and the movable contact element for the switch 7 are connected through parallel resistances 57, 58, 59, 60, 61, 62 and 63 with a common conductor 64 leading to the other terminal of the secondary 46 so that when any one of the switches is closed current flows through the battery and through the resistance that is connected in circuit by the closed switch. The other contacts 55 of the switches are connected with the signal lights 13, 14, 15 and 24, 25, 26 and 27, which have their other terminals connected to a conductor 65 attached to the conductor 44, therefore when any one of the switches is closed the corresponding signal light for that switch is energized by current by-passed through the contacts 55 and conductor 65 independently of the current flowing through the battery.

It is obvious that the amount of current flowing through the battery is dependent upon the number of parallel resistances connected into the circuit, and by providing resistances substantially proportionate to the resistances of various electrical equipment, as labeled above the respective switches, the current flowing through the battery and indicated by the device 28 will represent the service ability that may be expected of a battery when used for supplying such equipment in addition to the regular electrical system, and to show the superiority of one battery over another when operating on the same load.

The A. C. voltage of the battery terminals is of low value and it is desirable to provide amplification means to satisfactorily actuate a recording instrument having the desired range of movement. The flexible terminals of the battery are, therefore, connected by conductors 66 and 67 with the primary of a step-up transformer 68, wherein a step-up of voltage is attained within the secondary winding 69. The output of the secondary winding 69 is connected with the grid of an amplifying tube 70 wherein the voltage is again amplified and delivered to the primary of a second transformer 71 wherein the voltage is again increased. The secondary of the transformer 71 is connected with a rectifier circuit including a rectifier tube 72 and the rectified voltage is delivered to an amplifying tube 73 having its output connected with the metering device 28 to effect to movement of the indicator hand over the scale to the point corresponding to the intensity of the current flowing through the battery. The tubes 70, 72 and 73 are supplied with the proper plate and filament current from a suitable power source indicated at 74, the current being supplied from the lines 49 and 50 through a power transformer 75, having a secondary 76 for supplying filament current to the tubes 70, 72 and 73, and secondaries 77 and 78 for supplying plate voltage to the respective tubes through a rectifying tube 79 as in customary practice in circuits of this character.

In setting up the circuit to calibrate the indicating device 28, a switch 80 in the service line 50 is closed to effect energization of the amplifying circuit through the power transformer 75. We then connect a battery of known ampere hour capacity with the flexible connectors 35 and 36 in such manner that the half wave which actuates the rectified wave is not opposed by the battery voltage. In case of full wave rectification polarity of the battery need not be considered. Since the resistance 57 is in circuit with the battery and the primary winding of the transformer 68, an alternating current will flow through the battery and develop a potential at its terminals in proportion to its internal resistance or ampere hour capacity, also through the primary of the transformer in amounts proportional to their respective resistances. This potential is applied to the primary of the transformer 68 to develop an amplified induced potential in the secondary winding. The resistance of the primary is such that only a very small portion of the direct current from the battery will flow therethrough, which in turn is registered through the subsequent amplifying stages by the indicating device 28. When the hand comes to rest that portion of the scale may be marked as in the illustrated instance, "Good", which indicates that the battery is capable of supplying adequate current for the electrical system of a small automobile, the electrical resistance of which is represented in the circuit by the resistance 57. The remainder of the scale at the left of the pointer (Fig. 1) is divided into "Poor", and "Fair" areas, while the area on the opposite side is marked "Excellent", as shown.

Attention is directed to the circuit arrangement wherein the voltage actuating the indicating device is inversely proportional to the voltage at the battery terminals so that the meter reading is higher for lower voltages at the battery terminals. This is brought about by establishing the proper phase relation of the two potentials. The tube 73 is of the high mutual conductance type in order that a small change in the grid voltage thereof will produce a very large change in plate current, thereby effecting a wide differential in the indicator readings for batteries varying only slightly in internal resistance.

In case it becomes necessary to change one of the tubes, a new tube may change the reading of the indicating device 28 and for this reason a part of the resistance 57 is formed in a separate section, as indicated at 81, and is connected in circuit with the conductor 64 by a movable contact 82 so that when the new tube is inserted and a battery of known quality connected in the circuit the contact may be adjusted to provide the desired resistance for causing the pointer of the indicating device to return to its proper position on the scale. Instead of connecting a battery of known quality in the circuit a resistance element 83 of proper value may be connected across the primary of the winding of the transformer 68. This resistance may be in the form of a switch arm 84 pivotally mounted on the rear of the panel and having permanent connection with the conductor 35. The free end of the switch arm is provided with a hook 85 for engaging a terminal 86 that is permanently connected with the conductor 36.

Figure 3:
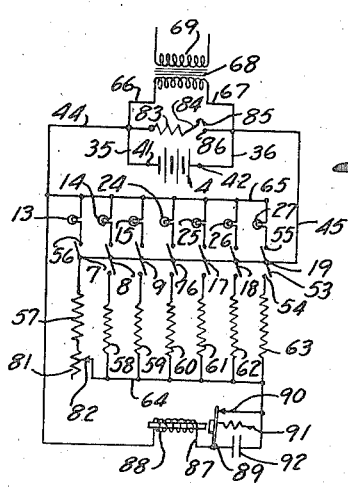
Fig. 3 is a similar view of a modified form of electrical circuit.

In the form of the invention illustrated in Fig. 3 the battery current is used for energizing the primary winding of the transformer 68. This is accomplished by interconnecting the conductors 44 and 64 with a vibrator 87 which includes an electromagnet 88 having its winding connected in circuit with the armature 89 thereof and with a contact 90 normally engaged by the armature under action of a coil spring 91. The armature and contact are also preferably connected in parallel by a condenser 92 to prevent sparking thereof during making and breaking of the circuit. The vibrator thus produces a pulsating current through the battery and through the primary of the transformer 68 so as to induce an alternating current in the amplifier circuit to effect actuation of the indicating device 28 in the same manner as in the preferred form of the invention.

In using the apparatus constructed and assembled as described, a battery is placed on the top 3 and the positive and negative terminals thereof are connected in the measuring circuit. For example, if the battery is to be used on a small car an 80 ampere battery is used. The switch is then closed for the small car designation and the current will flow through the battery and through the resistance 57 that is connected in circuit therewith. An alternating potential is set up in the secondary of the transformer 68 which is amplified and rectified so that it effects actuation of the indicator arm of the device 28. The pointer should move to the portion of the scale marked "Good". Then if a radio is to be used in the vehicle the switch 16 is closed to bring the resistance 60 into the circuit in parallel with the resistance 57. This will effect variation in the current flowing through the battery which variation is indicated through movement of the pointer possibly to the mark designating "Fair", showing that the additional load applied to the battery will result in "Fair" performance of the battery in the electrical system, which includes the starter, lights, and ignition, as well as the radio. Another battery having a higher ampere reading is then applied and if the pointer moves to the designation "Good" or "Excellent", it is suitable for operating a car with a radio installed as a part of the electrical system. Should the car be equipped with a heater as well as a radio, the switch 17 is closed to bring the resistance 61 into circuit which again will affect the current flowing through the battery so that the pointer will possibly move from "Good" position thereby indicating that the battery has not sufficient capacity to operate the radio together with the heater. Another battery is therefore substituted and connected with the testing device having a higher ampere rating which should then cause the pointer to move to "Good" or "Excellent" positions. If other accessories are used, such as a spot light, or high candle power bulbs in the headlights, the switches 18 and 19 are closed to determine whether or not the pointer will remain in "Good" or "Excellent" positions. If not, then it is necessary to provide a battery having a still higher ampere hour reading.

From the foregoing it is obvious that we have provided a testing apparatus wherein the serviceability of a battery may be accurately determined according to the number and types of electrical accessories to be connected in circuit therewith, so that a battery may be supplied having the proper ampere hour capacity to give the most satisfactory results for its intended use.

The device may be used for determining deterioration of used batteries since the internal resistance increases as the battery deteriorates, that is, a new battery which registers within the "Good" range will register within the "Fair" and "Poor" ranges after it has been used to the point where deterioration begins.

What we claim and desire to secure by Letters Patent is:

1. An apparatus for testing batteries including means for passing a fluctuating current through the battery, means for selectively connecting separate resistances with the battery corresponding to accessories to be connected with the battery, an amplifying circuit, means by-passing a definite proportion of the current for inducing current in the amplifying circuit, means for rectifying said induced current, and means including an indicator actuated by the effects of said rectified current to indicate serviceability of the battery.

2. In an apparatus for testing batteries, a circuit including the battery to be tested, an amplifying circuit, a plurality of resistances of differential values arranged in parallel with each other and in series with the battery, switches selectively connecting said resistances in the battery circuit, a transformer having its primary connected in parallel with the battery circuit and its secondary connected with the amplifying circuit, means supplying a fluctuating current to the battery circuit for flow through the battery whereby a portion of the current passes through the primary of the transformer to energize the amplifying circuit, means connected with the amplifying circuit for rectifying said current produced in the amplifying circuit, and means for indicating flow of the rectified current.

3. An apparatus for testing batteries including means for passing a fluctuating current through the battery, a plurality of separate resistances, means selectively connecting said resistances with the battery, an amplifying circuit, means by-passing a definite proportion of the current for inducing current in the amplifying circuit, means for rectifying said induced current, and indicator means actuated by said rectified current to indicate the serviceability of the battery when selected resistances are in circuit.

4. In an apparatus for comparing batteries, means for passing a fluctuating current through a battery to establish a fluctuating potential between the battery terminals, a plurality of resistance elements, means selectively connecting the resistance elements with the battery, means for establishing a secondary potential inversely proportional to the potential between the battery terminals, and means actuated by the last named potential for amplifying difference in potentials occurring across the terminals of the battery when the resistance elements are selectively connected with the battery.

5. In a battery testing apparatus for indicating serviceability of a battery when connected with predetermined loads, means for passing a fluctuating current through the battery, means connected with the battery for selectively applying predetermined impedances to the current flow through the battery in ratios corresponding to the respective predetermined loads, and indicator means connected with the battery and actuated by the fluctuating potential of said current for indicating serviceability of the battery when connected to loads represented by the respective impedances when selectively connected with the battery.

6. In a battery testing apparatus for indicating serviceability of a battery when connected with predetermined loads, means for passing a fluctuating current through the battery, means connected with the battery for selectively applying predetermined impedances to the current flow through the battery in ratios corresponding to the respective predetermined loads, means for amplifying the fluctuating potential at the battery, and indicator means connected with the amplifying means for indicating serviceability of the battery when connected to loads represented by the respective impedances when selectively connected with the battery.

7. In a battery testing apparatus for indicating serviceability of a battery when connected with predetermined loads, means for passing a fluctuating current through the battery, means connected with the battery for selectively applying predetermined impedances to the current flow through the battery in ratios corresponding to the respective predetermined loads, means for amplifying the fluctuating potential at the battery, means for rectifying the current produced by the amplied potential, and indicator means connected with the rectifying means to indicate serviceability of the battery when connected with loads represented by the respective impedances when selectively connected to the battery.

8. In a battery testing apparatus for indicating serviceability of a battery when connected with certain predetermined loads, means for passing a fluctuating current through the battery to establish a fluctuating potential at the battery terminals, means for selectively applying predetermined impedances to the current flow through the battery in ratios corresponding to the respective predetermined loads, means for establishing a secondary potential inversely proportional to the potential between the battery terminals, and means actuated by the last named potential for amplifying the difference in potentials occurring across the battery terminals when selective impedances are connected with the battery.

KENNETH S. BROOKS.
LESTER G. HENEL.